United States Patent [19]

Markovitz

[11] Patent Number: 5,191,977
[45] Date of Patent: Mar. 9, 1993

[54] STORAGE CONTAINER FOR STORING COMPACT DISC CASES AND MULTI-DISC CHANGER CARTRIDGE

[76] Inventor: Scott H. Markovitz, 23 Oakhurst Cir., Pittsburgh, Pa. 15215

[21] Appl. No.: 848,476

[22] Filed: Mar. 9, 1992

[51] Int. Cl.⁵ ............................................. B65D 85/57
[52] U.S. Cl. ........................... 206/309; 206/444; 211/40; 220/23.83; 220/505; 312/9.48
[58] Field of Search .................. 206/387, 309, 444; 211/40, 41; 220/505, 23.83; 312/9.48, 9.51

[56] References Cited

U.S. PATENT DOCUMENTS

| | | | |
|---|---|---|---|
| 3,907,116 | 9/1975 | Wolf et al. | 211/40 |
| 4,293,075 | 10/1981 | Veralrud | 211/40 |
| 4,306,655 | 12/1981 | Smith | 206/387 |
| 4,678,245 | 7/1987 | Fouassier . | |
| 4,707,247 | 11/1987 | Savoy . | |
| 4,744,463 | 5/1988 | Merzon | 206/387 |
| 4,771,887 | 9/1988 | Nehl | 206/387 |
| 4,781,423 | 11/1988 | Muenzer et al. | 206/387 X |
| 4,790,926 | 12/1988 | Mastronardo et al. . | |
| 4,819,802 | 4/1989 | Gutierrez . | |
| 4,889,244 | 12/1989 | Hehn et al. . | |
| 4,896,769 | 1/1990 | Merzon | 206/387 X |
| 4,901,876 | 2/1990 | Box . | |
| 4,932,522 | 6/1990 | Milovich . | |
| 4,939,625 | 7/1990 | Olson . | |
| 4,993,558 | 2/1991 | Assael | 211/40 |
| 5,088,619 | 2/1992 | Shank | 220/23.83 X |
| 5,127,716 | 7/1992 | Cooper et al. | 312/9.48 |

Primary Examiner—Bryon P. Gehman
Attorney, Agent, or Firm—Michael R. Swartz

[57] ABSTRACT

A storage container for storing cases for holding compact discs and a multi-disc changer cartridge for a compact disc player includes a housing having spaced side walls and bottom, top and rear walls which interconnect the side walls and therewith define an interior cavity being open at a front end of the housing. The housing also includes an interior partition wall spaced from the top and bottom walls of the housing and extending across the interior cavity between and interconnecting the side walls so as to define upper and lower interior compartments in the interior cavity of the housing. The lower compartment is shorter in height than the upper compartment so that the upper compartment is capable of removably receiving and storing therein the changer cartridge containing the compact discs in a given order. The upper compartment has a set of spaced ribs mounted on each of the side walls for removably receiving and storing the compact disc cases in the same order as that of the compact discs contained in the changer cartridge.

13 Claims, 3 Drawing Sheets

STORAGE CONTAINER FOR STORING COMPACT DISC CASES AND MULTI-DISC CHANGER CARTRIDGE

BACKGROUND OF THE INVENTION

1. Field of the Invention

The present invention generally relates to article storage systems and, more particularly, is concerned with a storage container and method for storing compact disc cases and a multi-disc changer cartridge.

2. Description of the Prior Art

Digital audio compact discs have become the preferred media for many listeners of recorded music, substantially replacing phonograph records and audio cassette tapes. Compact discs are typically sold in generally flat transparent rectangular plastic cases. With the advent of compact discs, many different devices have been proposed for storing the cases with the compact discs contained therein. Representative of such storage devices in the prior patent art are the ones disclosed in U.S. Pat. Nos. to Fouassier (4,678,245), Savoy (4,707,247), Mastronardo et al (4,790,926), Gutierrez (4,819,802), Hehn et al (4,889,244), Milovich (4,932,522) and 4,939,625). Further, compact disc players currently available on the market for playing the discs are in either single-play or multiple-play models. The single-play model of compact disc player is loaded with and plays a single compact disc at a time. The multiple-play model of compact disc player is loaded with a disc changer which, in turn, holds multiple compact discs for playing the discs in the order in which either they are arranged in the changer or are selected to be played by the user.

There are two basic types of disc changers, a carousel-type changer and a magazine-type changer. The carousel-type changer typically takes the form of a revolving platter provided as a slide-out drawer which holds multiple compact discs, such as five, arrayed in a circular pattern on the platter. The magazine-type changer typically takes the form of a rectangular cartridge which holds multiple compact discs spaced vertically one above another in a stacked array. The cartridge inserts into a cavity in the player.

An advantage of the magazine-type changer is that, until the user decides to change individual compact discs, the changer can function as the storage device for the discs which avoids the need to handle the individual discs each time in order to load and play them. However, over an extended period of time, it is easy for the user to forget which discs are loaded in the cartridge and in what sequence. The advantage of storing them in the cartridge, which is to avoid the need to handle the discs in order to play them, is sacrificed if, in order to recall which discs are in the cartridge and what their sequence is, they must first be removed from the cartridge and examined.

Consequently, a need exists for an easy and convenient way to determine which compact discs are in the cartridge and in what sequence without first having to remove them.

SUMMARY OF THE INVENTION

The present invention provides a storage container and method designed to satisfy the aforementioned needs. The storage container and method of the present invention provides an easy way to store a multi-disc changer cartridge for a compact disc player containing a plurality of compact discs in a given sequence and to store the cases for the compact discs in the same sequence as the given sequence of the compact discs. In such manner, the user can readily recall which compact discs are in the changer cartridge and in what order or sequence they are arranged in the cartridge.

Accordingly, the present invention is directed to a storage container for storing cases for holding compact discs and a multi-disc changer cartridge for a compact disc player. The storage container comprises: (a) a housing having an interior cavity; (b) first means in the interior cavity of the housing for removably storing a multi-disc changer cartridge containing a plurality of compact discs in a given order; and (c) second means in the interior cavity of the housing for removably storing a plurality of cases for the plurality of compact discs in the same order as the given order of the compact discs contained in the changer cartridge. The cavity of the housing is open at one end. An end of each of the cases stored in the cavity is observable from outside the housing through the open end thereof.

More particularly, the housing has a pair of spaced side walls and bottom, top and rear walls interconnecting the side walls and therewith defining the interior cavity being open at a front end of the housing. The first means is a lower compartment in the cavity of the housing, whereas the second means is an upper compartment in the cavity of the housing. The upper compartment includes means for holding the plurality of cases in a stacked relationship in which the cases are spaced one above another. The holding means is a set of spaced ribs defined on each of the opposite side walls of the housing in the upper compartment thereof. Also, the housing includes an interior partition wall spaced from the top and bottom walls of the housing and extending across the interior cavity between and interconnecting the opposite side walls so as to define the upper and lower interior compartments in the cavity of the housing. The lower compartment is shorter in height than the upper compartment.

The present invention is also directed to a method of storing cases for holding compact discs and for storing a multi-disc changer cartridge for a compact disc player. The storing method comprises the steps of: (a) providing a first storage compartment configured to removably receive and store a multi-disc changer cartridge containing a plurality of compact discs; (b) storing the multi-disc changer cartridge in the first storage compartment with the plurality of compact discs being contained in a given order therein; (c) providing a second storage compartment configured to removably receive and store a plurality of cases for the compact discs contained in the changer cartridge; and (d) storing the compact disc cases in the second storage compartment in the same sequence that the compact discs are contained in the changer cartridge. The storing method further includes providing a housing having an open end and containing the first and second storage compartments therein, and displaying ends of the compact disc cases through the open end of the housing.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
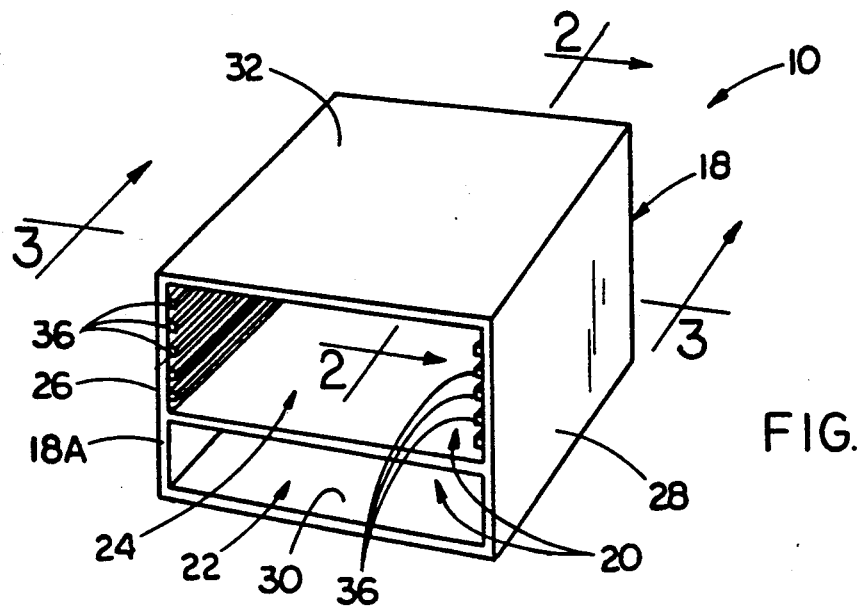
FIG. 1 is a perspective view of a single storage container of the present invention for storing compact disc cases and a multi-disc changer cartridge.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 2:
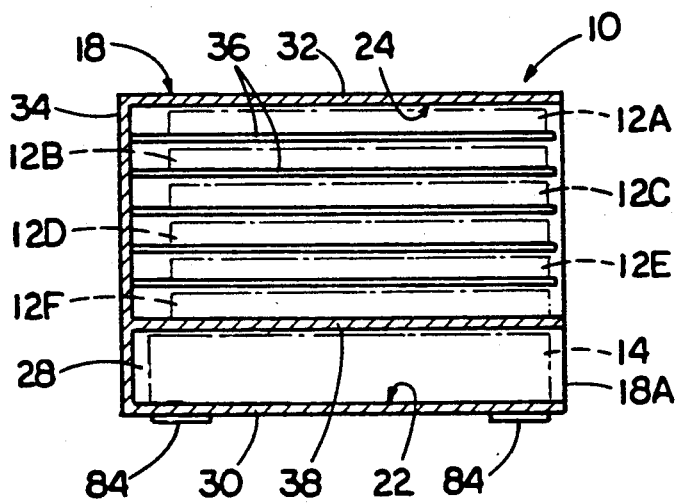
FIG. 2 is an enlarged front-to-back vertical sectional view of the single storage container taken along line 2—2 of FIG. 1.
Figure 3:
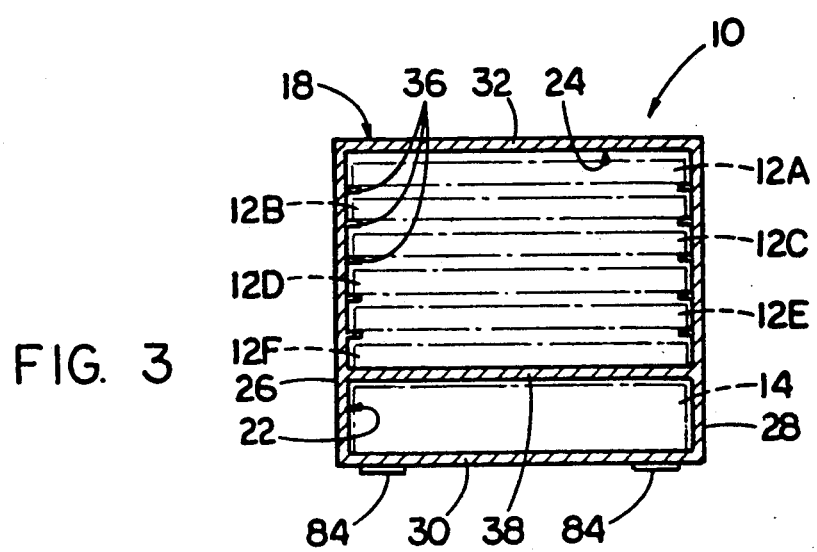
FIG. 3 is an enlarged side-to-side vertical sectional view of the single storage container taken along line 3—3 of FIG. 1.
Figure 4:
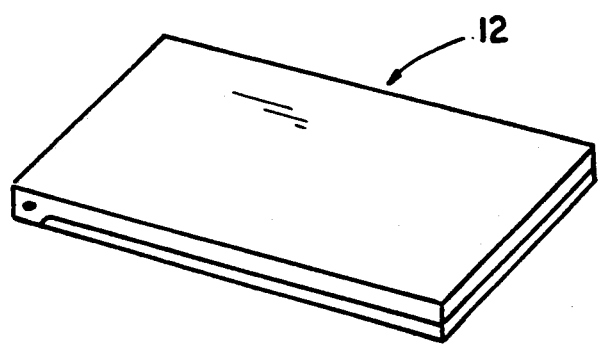
FIG. 4 is a perspective view of a storage case for containing a compact disc.
Figure 5:
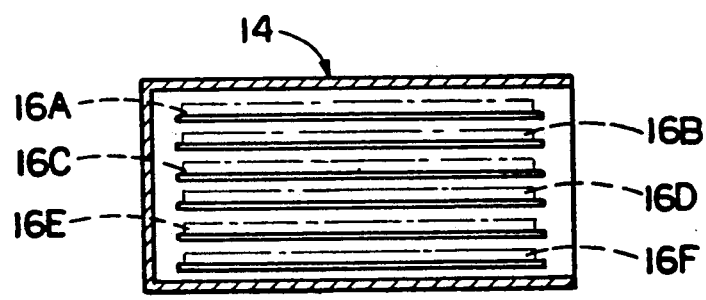
FIG. 5 is a diagrammatic front-to-rear vertical sectional view of a multi-disc changer cartridge.

Referring now to the drawings, and particularly to FIGS. 1-3, there is illustrated one preferred embodiment of the present invention in the form of a single storage container, generally designated 10, for storing a plurality of compact disc storage cases 12 (only one being shown in FIG. 4), typically composed of a transparent plastic material, and a multi-disc changer cartridge 14 (FIG. 5) for a compact disc player (not shown) containing the plurality of compact discs 16A-16F taken from the respective cases 12.

Referring to FIGS. 1-3, the single storage container 10 includes a housing 18 having an interior cavity 20, and lower and upper compartments 22, 24 in the cavity 20 of the housing 18. The lower compartment 22 is configured for removably storing the multi-disc changer cartridge 14, as shown in dashed line form in FIGS. 2 and 3. The changer cartridge 14, in turn, contains the compact discs 16A-16F in a given order selected by the user, such as shown in dashed line form in FIG. 5. The upper compartment 24 is configured for removably storing the plurality of compact disc storage cases 12A-12F, as shown in dashed line form in FIGS. 2 and 3, in the same order as the given order of the compact discs 16A-16F in the changer cartridge 14. The interior cavity 20 of the housing 18 is open at one end 18A. As seen in FIG. 3, ends of the compact disc storage cases 12A-12F are displayed and thus visible to the outside of the housing 18 through the open end 18A thereof. Titles on inserts (not shown) contained in the compact disc storage cases 12A-12F can be readily observed and read by the user through the displayed ends of the transparent cases 12A-12F without first having to remove the cases 12A-12F from the housing 10 or to remove the compact discs 16A-16F from the changer cartridge 14.

More particularly, as seen in FIG. 1-3, the housing 18 of the single storage container 10 has a generally rectangular shape and is formed by a pair of spaced side walls 26, 28, a pair of bottom and top walls 30, 32 extending between and rigidly connected with the side walls 26, 28, and a rear wall 34 extending between and rigidly connected with the side walls 26, 28 and bottom and top walls 30, 32. The rigidly connected side walls 26, 28, bottom wall 30, top wall 32 and rear wall 34 together define the interior cavity 20 being open at the front end 18A of the housing 18. The upper compartment 24 includes means 36 for holding the plurality of compact disc storage cases 12A-12F in a stacked relationship in which the storage cases 12 are spaced one above another. The holding means 36 is a set of vertically-spaced longitudinally-extending ribs 36 defined on and projecting into the upper compartment 24 from the interior surfaces of each of the side walls 26, 28 of the housing 18.

Also, as seen in FIGS. 1-3, the housing 18 of the single storage container 10 includes an interior partition wall 38 spaced from the bottom and top walls 30, 32 of the housing 18 and extending across the interior cavity 20 between and rigidly interconnecting the side walls 26, 28 so as to physically define the lower and upper interior compartments 22, 24 in the cavity 20 of the housing 18. The lower compartment 22 is shorter in height than the upper compartment 24.

Figure 6:
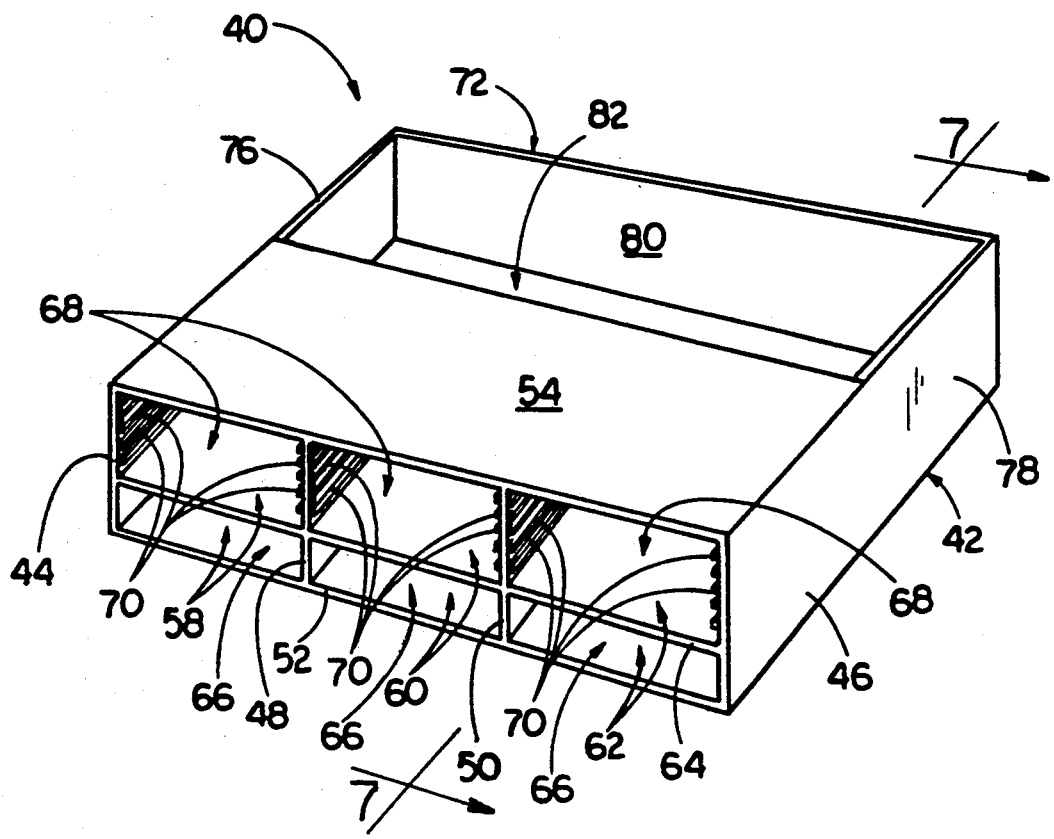
FIG. 6 is a perspective view of a multiple storage container of the present invention for storing compact disc cases and several multi-disc changer cartridges.
Figure 7:
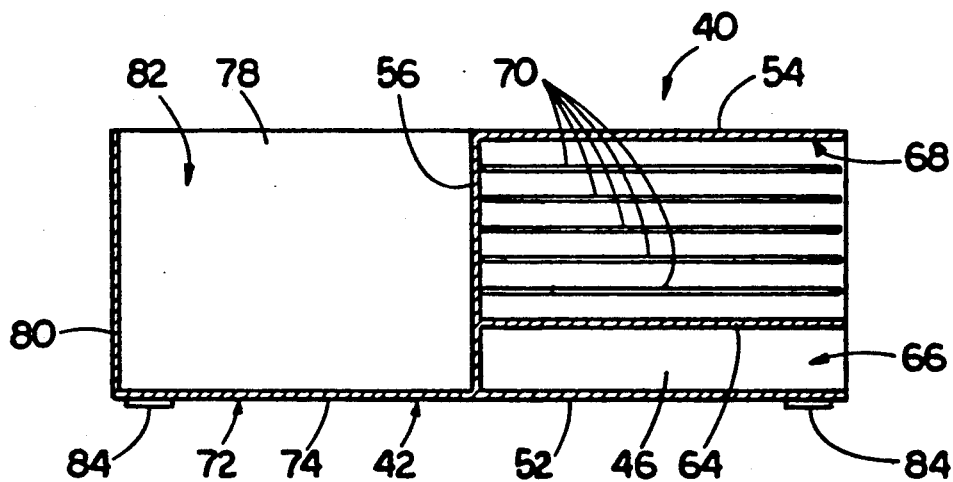
FIG. 7 is a front-to-rear vertical sectional view of the multiple storage container taken along line 7—7 of FIG. 6.

Referring to FIGS. 6 and 7, there is illustrated another preferred embodiment of the present invention in the form of a multiple storage container, generally designated 40, for storing multiple sets of compact disc storage cases and multi-disc changer cartridges, in substantially the same manner as described and illustrated with respect to the single storage container 10. The portion of the multiple storage container 40 which receives and stores one set of compact disc storage cases 12 (FIG. 4) and one changer cartridge 14 (FIG. 5) containing the compact discs taken from the storage cases 12 is substantially identical to the single storage container 10 as described above with respect to FIGS. 1-3. While the multiple storage container 40 being illustrated in FIGS. 6 and 7 is constructed to store three such sets of compact disc storage cases and changer cartridges, the container 40 could be constructed to store other numbers of such sets.

The multiple storage container 40 includes a housing 42 having a generally rectangular shape. The housing 42 is formed by spaced side and interior walls 44, 46 and 48, 50 and bottom, top and rear walls 52, 54, 56 rigidly connected with one another and extending between and rigidly connected with the side walls 44, 46 and interior walls 48, 50. The side and interior walls 44, 46 and 48, 50 and the bottom, top and rear walls 52, 54, 56 of the housing 42 together define a plurality of side-by-side interior cavities 58, 60, 62 being open at a front end 42A of the housing 42. The multiple storage container 40 also includes an interior partition wall 64 in the housing 42 physically defining lower and upper interior compartments 66, 68 in each of the housing cavities 58, 60, 62. The partition wall 64 is spaced from the bottom and top walls 52, 54 of the housing 42 and extend across the interior cavities 58, 60, 62 between and rigidly connecting with the side walls 44, 46 and interior walls 48, 50 so as to define the lower and upper compartments 66, 68 in the cavities 58, 60, 62 of the housing 42. Also, the partition wall 64 extends substantially parallel to bottom and top walls 52, 54 of the housing 42 and extends substantially perpendicular to the side walls 44, 46, interior walls 48, 50 and rear wall 56 thereof.

The lower compartments 66 in the housing 42 are of the same height relative to one another. The upper compartments 68 in the housing 42 are of the same height relative to one another. The lower compartments 66 are shorter in height than the upper compartments 68. As in the single storage container 10, each lower compartment 66 of the multiple storage container 40 is capable of removably receiving and storing therein one player cartridge containing a plurality of compact discs in a given order, and each upper compartment 68 is capable of removably receiving and storing therein the plurality of compact disc storage cases from which the compact discs were removed. Means in the form of sets of vertically-spaced longitudinally-extending ribs 70 are defined on the interior surfaces of the side walls 44, 46 and on the opposite surfaces of the interior walls 48, 50 in the upper compartments 68 for holding the respective storage cases for the compact discs in the same order as the given order of the compact discs in the player cartridges.

Further, the housing 42 of the multiple storage container 40 can include a rear portion 72 attached to and extending from the rear wall 56 of the housing. The rear portion 72 includes a bottom wall 74 which is an extension of the bottom wall 52 and a pair of side walls 76, 78 which are extensions of the side walls 44, 46. The rear portion 72 also includes a rear wall 80 rigidly connected with the bottom and side walls 74, 76, 78 and spaced from the rear wall 56 so as to define a storage compartment 82 with an open top 82A being much larger in size than the other compartments of the container 40.

The bottom wall 30 of the single storage container housing 18 and the bottom walls 52, 74 of the multiple storage container housing 42 have foot pads 84 thereon. The foot pads 84 are located adjacent to the lower corners of the housings 18, 42 for supporting the containers 10, 40 on a support surface.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A storage container for storing cases for holding compact discs and for storing a multi-disc changer cartridge for a compact disc player, said storage container comprising:
  (a) a housing having an interior cavity and including an interior partition wall extending across said interior cavity so as to define a pair of separate interior compartments in said cavity of said housing;
  (b) one of said pair of separate interior compartments of said housing having means for removably storing a multi-disc changer cartridge containing a plurality of compact discs in a given order; and
  (c) the other of said pair of separate interior compartments of said housing being greater in height than said one of said pair of separate interior compartments and having means for removably storing a plurality of cases for the plurality of compact discs in the same order as the given order of the compact discs contained in the changer cartridge.

2. The storage container as recited in claim 1, wherein:
  said interior cavity of said housing has an open end such that, when the plurality of cases for compact discs are stored in said cavity, an end of each of the plurality of cases is displayed to outside of said housing through said open end of said cavity.

3. The storage container as recited in claim 1, wherein:
  said one of said pair of separate interior compartments is a lower compartment in said cavity of said housing; and
  said other of said pair of separate interior compartments is an upper compartment in said cavity of said housing.

4. The storage container as recited in claim 3, wherein said upper compartment includes means for holding the plurality of cases in a stacked relationship in which the cases are spaced one above another.

5. The storage container as recited in claim 4, wherein said holding means is a set of spaced ribs defined on each of a pair of opposite sides of said interior cavity.

6. A storage container for storing cases for holding compact discs and for storing a multi-disc changer cartridge for a compact disc player, said storage container comprising:
  (a) a housing having spaced side walls and bottom, top and rear walls interconnecting said side walls and therewith defining an interior cavity being open at a front end of said housing, said housing also having an interior partition wall spaced from said top and bottom walls of said housing and extending across said interior cavity between and interconnecting said spaced side walls so as to define a pair of separate upper and lower interior compartments in said cavity of said housing;
  (b) one of said separate upper and lower interior compartments being shorter in height than the other of said separate upper and lower interior compartments such that said one of said separate upper and lower interior compartments is capable of removably receiving and storing therein a changer cartridge containing a plurality of compact discs; and
  (c) means defined on said side walls in said other of said separate upper and lower interior compartments for holding a plurality of cases for the compact discs contained in the changer cartridge in a same order as that of the compact discs in the changer cartridge.

7. The storage container as recited in claim 6, wherein said interior partition wall extends substantially parallel to said top and bottom walls of said housing and substantially perpendicular to said side and rear walls.

8. The storage container as recited in claim 6, wherein said lower compartment is shorter in height than said upper compartment.

9. The storage container as recited in claim 6, wherein said holding means defined on said side walls are a set of spaced ribs defined on each of said side walls.

10. A storage container for storing cases for holding compact discs and for storing multi-disc changer cartridge for a compact disc player, said storage container comprising:
  (a) a housing having spaced side and interior walls and bottom, top and rear walls interconnecting said side and interior walls and therewith defining a plurality of side-by-side interior cavities being open at a front end of said housing;
  (b) an interior partition wall in said housing defining upper and lower interior compartments in each of said cavities of said housing;
  (c) said lower compartments being shorter in height than said upper compartments such that each of said lower compartments is capable of removably receiving and storing therein a changer cartridge containing a plurality of compact discs; and
  (d) means defined on said side and interior walls in said upper compartments for holding a plurality of cases for the compact discs contained in the changer cartridges in a same order as that of the compact discs in the changer cartridges;
  (e) said housing also having a rear portion attached to and extending from said rear wall of said housing, said rear portion defining a storage compartment with an open top.

11. The storage container as recited in claim 10, wherein said interior partition wall is spaced from said top and bottom walls of said housing and extends across said interior cavity between and interconnecting said side and interior walls so as to define said upper and lower interior compartments in said interior cavity of said housing.

12. The storage container as recited in claim 11, wherein said interior partition wall extends substantially parallel to said top and bottom walls of said housing and substantially perpendicular to said side, interior and rear walls.

13. The storage container as recited in claim 10, said holding means are a set of spaced ribs defined on each of said side and interior walls.

* * * * *